Patented Aug. 20, 1929.

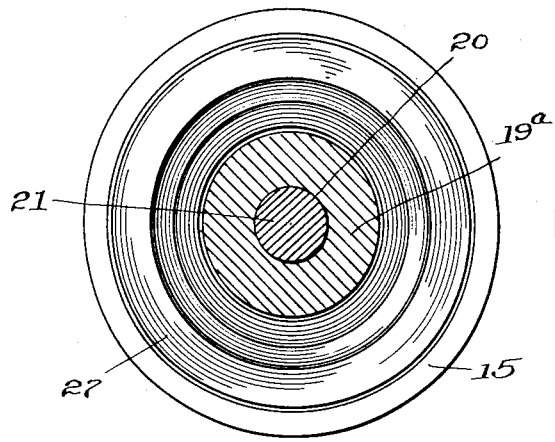
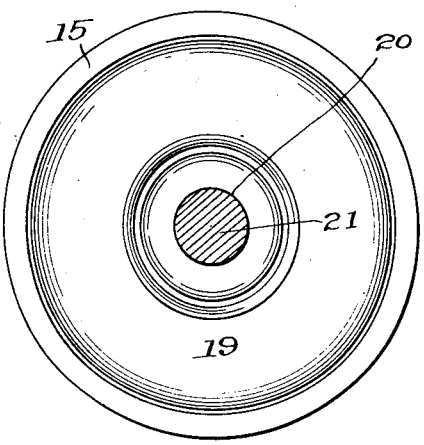
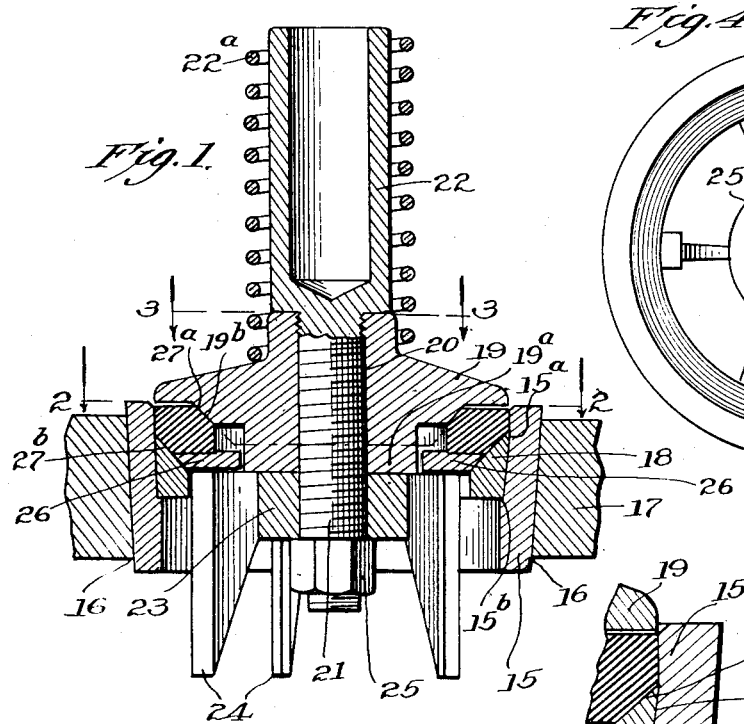
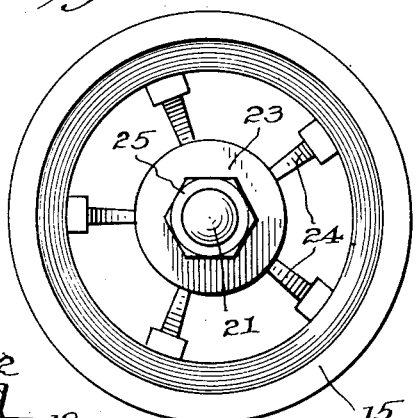
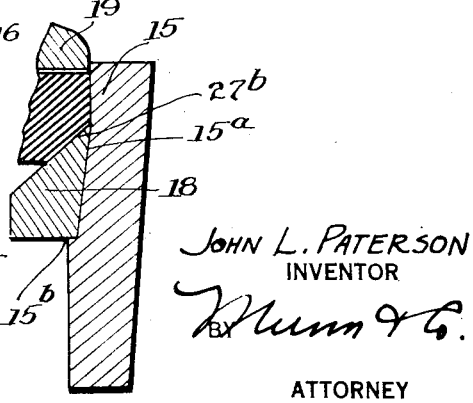

1,725,297

UNITED STATES PATENT OFFICE.

JOHN L. PATERSON, OF VENTURA, CALIFORNIA.

PUMP VALVE.

Application filed September 26, 1927. Serial No. 222,080.

My invention relates to valves for pumps handling heavy fluids and particularly, although not necessarily, valves for slush pumps as used in the drilling of oil wells.

It is a purpose of my invention to provide a pump valve characterized by its ability to seal itself in closed position against possible leakage through the port which it controls; a valve cage having a seat readily removable to permit the substitution of a new seat when required, and without removing the valve cage from the body of the pump thus lessening the danger of injuring the pump casting.

It is also a purpose of my invention to provide in a pump valve a valve stem which is hollow to lighten its weight and to facilitate its removal from the pump.

I will describe only one form of pump valve embodying my invention and will then point out the novel features in claims.

Fig. 1 is a view showing in vertical section one form of valve embodying my invention in applied position to a pump body;

Figs. 2 and 3 are vertical sectional views taken on the lines 2—2 and 3—3, respectively, of Fig. 1;

Fig. 4 is a view showing the valve in bottom plan; and

Fig. 5 is an enlarged fragmentary vertical sectional view of the valve and cage illustrating the precise manner in which these elements are associated with each other when the valve is in closed position.

Referring specifically to the drawings, my invention in its present embodiment comprises a valve cage 15 which is conical or tapered to have a sliding fit within a port 16 of tapered form in cross-section, the port being formed in the pump body 17. In associating the cage with the port in this manner, the cage can be readily removed from the port when required. The inner wall of the cage is provided with a slightly tapered portion 15ª and a shoulder 15ᵇ, and into this portion is fitted a seat 18 formed of any suitable metal. The shoulder 15ᵇ increases the strength of the cage as a whole and eliminates the possibility of the seat 18 working loose and dropping into the pump. This seat 18 is likewise removable from the cage 15 in order that it may be renewed when required.

The valve proper comprises a head 19 provided with a central opening 20 in which is threaded a shank 21 formed on the lower end of a valve stem 22, the latter being hollow, as illustrated in Fig. 1, for the purpose of lightening its weight and to facilitate its removal from the pump. It will be understood that the stem is adapted to extend into the usual stem and valve guide, and a spring 22ª may be associated with the stem 22 in the manner illustrated to aid in closing the valve quickly. The shank 21 is of such length as to project from the lower side of the head 19, and mounted on this projecting portion is a valve guide 23 provided with a plurality of wings 24. The guide is secured on the shank by means of a nut 25, and it is movable in the seat and adapted to guide the valve to its proper seat as will be understood.

The lower side of the valve head is provided with a boss 19ª against which the guide 23 is secured by the nut 25. Loosely fitted on this boss is a flat ring 26 provided for the purpose of minimizing wear of a gasket 27 formed of rubber or any other suitable resilient or elastic material. The ring 26 is arranged at the bottom of the gasket 27 and its outer edge is beveled, as shown in Fig. 1, to have contact with the conical or beveled inner surface of the seat 18. The wings 24 of the guide 23 serve to confine both the ring 26 and the gasket 27 upon the valve head 19 so that they move vertically with corresponding movement of the valve head as the latter moves to open or closed position.

As shown in Figs. 1 and 5, the gasket 27 is formed with inclined surfaces 27ª and 27ᵇ, the surface 27ª engaging a similar surface 19ᵇ of a head 19, while the surface 27ᵇ is adapted to contact with the inner surface of the seat 18 when the valve is in closed position. By reason of the surface 19ᵇ in its coaction with the surface 27ª, the valve head serves to spread the gasket radially as the valve moves to closed position thereby firmly pressing the gasket into fluid tight engagement with the seat 18. This is an important feature of my invention as it is by means of this gasket and the manner in which it is associated with the valve head and seat that a piston valve effect is produced to effectively seal the port against leakage and a result extremely difficult to obtain in slush pumps.

In practice, fluid under pressure at the lower side of the valve will operate to open the latter, and when such fluid attempts to return through the port the valve will close and seat itself on the tapered seat surface 18. As the pressure increases on the upper side of the valve it will force the valve head down on the gasket 27 and thus expand the latter against the inner wall of the seat 18 as well as the cage 15, thereby producing a positive seal. When the pressure from below again equals the pressure above, the gasket will contract to its original size and allow the valve to open as freely as before.

Although I have herein shown and described only one form of pump valve embodying my invention, it is to be understood that various changes and modifications may be made herein without departing from the spirit of the invention and the spirit and scope of the appended claims.

I claim:

1. In combination, a pump body formed with a conical port, a conical cage removably fitted in the port, a conical seat removably fitted in the cage, a valve head, a guide secured to the head and movable in the seat, a gasket on the head of yieldable material and adapted to engage the seat when the head is in closed position, said gasket, head, and seat having surfaces coacting to spread the gasket radially so as to firmly press it against the seat and against the cage, and a wear ring movable freely on the head and partly interposed between the gasket and seat to reduce wear of the gasket.

2. A pump valve comprising a cage, a conical seat removably fitted in the cage, a valve head, a guide secured to the head and movable in the seat, a gasket on the head of yieldable material adapted to engage the seat when the head is in closed position, said gasket head and seat having surfaces coacting to spread the gasket radially so as to firmly press it against the seat and against said cage, and a wear ring movable freely on the head and partly interposed between the gasket and seat to reduce wear of the gasket.

3. A pump valve comprising a cage, a conical seat removably fitted in the cage, a valve head, a guide secured to the head and movable in the seat, and a gasket on the head of yieldable material adapted to engage the seat when the head is in closed position, said gasket, head, and seat having surfaces coacting to spread the gasket radially so as to firmly press it against the seat and against said cage.

4. A pump valve comprising a head, a stem on the head, a shank on the stem extending through the head, a guide secured to the shank, a ring freely movable on the head for engagement with a valve seat and confined against displacement by said guide, and a yieldable gasket for engaging said seat interposed between the head and ring.

5. A pump valve as embodied in claim 5 wherein said gasket and head are provided with surfaces coacting to spread the gasket radially when the ring and gasket are brought into engagement with a valve seat.

6. In combination, a pump body formed with a conical port, a conical cage removably fitted in the port, a seat removably fitted in the cage, a valve head, a guide secured to the head, and movable in the seat, a gasket on the head of yieldable material and adapted to engage the seat when the head is in closed position, said gasket, head, and seat having surfaces coacting to spread the gasket radially so as to firmly press it against the seat and against the cage.

7. A pump valve comprising a cage, a seat in the cage, a valve head, a guide secured to the head and movable in the seat, and a gasket on the head of yieldable material adapted to engage the seat when the head is in closed position, said gasket, head, and seat having surfaces coacting to spread the gasket radially so as to firmly press it against the seat and against said cage.

8. In combination, a valve cage having a conical and shouldered bore, and a valve seat member having a conical surface removably fitted in the bore of the cage and seated on the shouldered portion thereof.

JOHN L. PATERSON.